United States Patent [11] 3,607,786

[72] Inventors Hans Nienburg
   Ludwigshafen;
   Karl Eichner, Munich; Peter Tavs,
   Ludwigshafen; Horst Kerber, Mannheim,
   all of, Germany
[21] Appl. No. 781,636
[22] Filed Dec. 5, 1968
[45] Patented Sept. 21, 1971
[73] Assignee Badische Anilin- & Soda-Fabrik
   Aktiengesellschaft
   Ludwigshafen, Rhein, Germany
[32] Priority Dec. 7, 1967
[33] Germany
[31] P 16 42 944.0

[54] PRODUCTION OF A CONCENTRATED AQUEOUS COBALT SALT SOLUTION
   6 Claims, No Drawings
[52] U.S. Cl. ................................................. 252/431,
   260/604, 252/416
[51] Int. Cl. ...................................................... C07c 45/02
[50] Field of Search ............................................ 260/604,
   431; 252/414, 413, 416, 417

[56] References Cited
   UNITED STATES PATENTS
   3,298,779  1/1967  Toshihide Goto ............  23/117
   2,547,178  4/1951  Spence ........................  23/50

*Primary Examiner*—Daniel E. Wyman
*Assistant Examiner*—Philip M. French
*Attorney*—Johnston, Root, O'Keefe, Keil, Thompson & Shurtleff ABSTRACT: A process for the production of an aqueous solution of cobalt salts of aliphatic carboxylic acids having from two to eight carbon atoms which contains from 3 to 8 percent by weight of cobalt and is suitable as a catalyst solution for the oxo synthesis, in which process an aqueous solution of cobalt salts obtained by treating an oxo reaction mixture with oxidants in an aqueous acid medium at elevated temperature and separation of the aqueous solution and containing from 0.5 to 1.5 percent by weight of cobalt is treated with from 0.01 to 3 percent by weight, with reference to the aqueous cobalt salt solution to be treated, of a noble metal from group VIII of the Periodic System in the presence of an amount equivalent to the amount of cobalt contained in the aqueous solution of an aliphatic carboxylic acid having from two to eight carbon atoms, and subsequent concentration by distillation.

PRODUCTION OF A CONCENTRATED AQUEOUS COBALT SALT SOLUTION

The present invention relates to a process for the production of a more highly concentrated aqueous cobalt salt solution as a catalyst solution for oxo reactions from a dilute aqueous cobalt salt solution which has been obtained in the oxidative removal of cobalt from oxo reaction mixtures.

It is known that in the reaction of olefins such as ethylene, propylene, butylene, heptenes or nonenes with carbon monoxide and hydrogen at elevated temperature and superatmospheric pressure in the presence of cobalt catalysts according to the reaction known as the oxo reaction, reaction mixtures are formed which contain not only aldehydes and alcohols but also dissolved amounts of cobalt carbonyl compounds. It is customary to remove the cobalt compounds from the crude product prior to further processing.

A process which is often used for removing cobalt from oxo reaction mixtures consists in treating the mixtures at elevated temperature in aqueous-acid medium with oxidizing agents so that the cobalt compounds become readily separable as dissolved salts in the aqueous phase. Since the cobalt salt solutions obtained always contain cobalt compounds which are relatively sparingly soluble in water, only very dilute aqueous cobalt salt solutions having a cobalt content of from about 0.5 to 1.5 percent by weight can be prepared therefrom. When these dilute cobalt salt solutions are reused as catalyst solutions for the oxo reaction, the relatively large content of water has an unfavorable effect on the oxo reaction (cf. U.S. Pat. No. 2,757,205). It is the object of this invention to provide a process for the production of more highly concentrated solutions of cobalt salts from the said dilute cobalt salt solution in which process sparingly soluble cobalt salts do not precipitate from the resultant more highly concentrated cobalt salt solutions at room temperature. Another object of the invention is to provide a process according to which the dilute cobalt salt solutions can easily be concentrated. In accordance with this invention these and other objects and advantages are achieved in a process for the production of a more highly concentrated aqueous solution of a cobalt salt suitable as a catalyst solution for the oxo reaction from a dilute aqueous cobalt salt solution which has been obtained in the treatment of an oxo reaction mixture with an oxidizing agent in an aqueous acid medium at elevated temperature followed by separation of the aqueous phase, wherein the dilute aqueous cobalt salt solution is treated in the presence of an aliphatic carboxylic acid having two to eight carbon with a noble metal from group VIII of the Periodic System, preferably while passing in oxygen or a gas containing molecular oxygen, and then the solution is concentrated by a conventional method.

According to the new process, aqueous cobalt salt solutions having a cobalt content of about 3 to 8 percent by weight can be obtained from the aqueous cobalt salt solutions having a cobalt content of from about 0.5 to 1.5 percent by weight obtained in the oxidative removal of cobalt, without sparingly soluble cobalt salt being precipitated at room temperature.

The noble metals to be used according to the process of the invention are advantageously used singly. Mixtures or alloys of two or more of these noble metals may however also be used. The preferred noble metals are platinum and particularly palladium. The noble metal is advantageously used in finely divided form. The noble metal may be used as such or on a carrier. Examples of suitable carriers are silica gel, aluminum oxide and active carbon. The ratio by weight of noble metal to carrier may vary within wide limits. It is preferred to use noble metal and carrier in a weight ratio of from 0.5:99.5 to 20:80. It is advantageous to use from 0.01 to 3 percent by weight of noble metal (with reference to the solution) for treating the dilute aqueous cobalt salt solution by the new process. No decrease in activity of the noble metals in the working up of the dilute aqueous cobalt salt solutions is observed when they are used more than once, for example five times.

The noble metal, alone or applied to a carrier, is advantageously suspended in the solution for the treatment of the aqueous cobalt salt solution by the process according to the invention. The noble metal supported on a carrier may however also be arranged in a fixed bed and the cobalt salt solution passed thereover, for example by trickling it down the fixed bed or by passing it through the fixed bed from below.

The treatment with the noble metals to be used in the process according to this invention is advantageously carrier out at temperatures of from 50° to 150° C. At temperatures up to 100° C., atmospheric pressure is generally used. At higher temperatures than this, it is advantageous to carry out the process at the steam pressure set up in the treatment chamber. Depending on the reaction temperature and on how intensely the cobalt salt solution is contacted with the precious metal, the treatment generally takes from 5 minutes to 2 hours.

The treatment by the process according to this invention is carried out in the presence of an aliphatic carboxylic acid having two to eight, preferably two to four, carbon atoms or mixtures of these carboxylic acids. Examples of suitable carboxylic acids are n-butyric acid, isobutyric acid, caproic acid and particularly acetic acid and propionic acid. The carboxylic acid is advantageously used in the amount required to convert the cobalt contained in the solution into the corresponding cobalt acylate. An excess of carboxylic acid, for example of from about 5 to 20 percent, is however not detrimental. The dilute aqueous cobalt salt solution obtained in the oxidative removal of cobalt in an aqueous acid medium often already contains an adequate amount of a carboxylic acid to be used in the process according to this invention and which has been used for the removal of cobalt, so that in this case the addition of a further amount of carboxylic acid may be dispensed with.

It is advantageous to pass oxygen or a gas containing molecular oxygen, particularly air, through the solution during the treatment of the dilute cobalt salt solution with the noble metal to be used according to this invention, so that the duration of the treatment may be shortened.

About 0.5 liter to 10 liters (STP) of oxygen is advantageously passed in per liter of dilute aqueous cobalt salt solution.

The cobalt salt solution obtained after treatment with the noble metal is then converted into a cobalt salt solution of higher concentration by a conventional method, advantageously after the noble metal has been separated. This may be carried out for example by using a falling-film evaporator. It is advantageously after the noble metal has been separated. This may be carried out for example by using a falling-film evaporator. It is advantageous to distill off such an amount of water that the cobalt solutions having a cobalt content of from about 3 to 8 percent by weight, depending on the carboxylic acid used, which in this form may be recycled as catalyst solutions to the oxo reaction.

The examples illustrate the process of the invention. The parts specified in the examples are parts by weight. They bear the same relation to parts by volume as the gram to the liter.

EXAMPLE 1

An aqueous cobalt salt solution (which has been obtained by treating an oxo reaction mixture obtained from propylene with air at 115° C. in the presence of dilute aqueous acetic acid followed by separation of the aqueous phase) contains 1.14 percent by weight of cobalt. 3 parts of 99 percent by weight acetic acid is added to 100 parts of this solution which is then stirred for 30 minutes at from 95 percent to 100 percent C. with 3 parts of palladium supported on animal charcoal while passing through 3 parts by volume of air. The palladium animal charcoal is filtered off by suction and water is distilled off from the solution obtained. A solution containing 7 percent by weight of cobalt is obtained from which no cobalt compound is precipitated even after it has stood for a long time at 20° C. There is no decline in activity of the palladium animal charcoal in the working up of dilute aqueous cobalt salt solution even after it has been used five times.

If on the contrary an attempt is made to convert the original dilute aqueous cobalt salt solution direct into a more highly concentrated solution, cobalt compounds are precipitated at 20° C. at a cobalt concentration as low as about 1.5 percent by weight.

EXAMPLE 2

An aqueous cobalt salt solution (which has been obtained by treating an oxo reaction mixture, obtained from isomeric heptenes, with air in the presence of dilute aqueous acetic acid at 115° C., followed by separation of the aqueous phase) contains 0.95 percent by weight of cobalt. 2.5 g. of 99 percent by weight acetic acid is added per 100 ml. of the solution which is passed at the rate of 0.3 liter per hour downwardly through a glass tube having a length of 55 cm. and a diameter of 3 cm. which is filled with 210 g. (300 ml.) of a catalyst of 1 percent by weight of palladium on aluminum oxide, a temperature of from 85° to 90° C. being maintained inside the tube by external heating. Moreover 3 liters per hour of air is passed into the lower end of the tube. The cobalt salt solution leaving the lower end of the tube is concentrated to a cobalt content of 4.53 percent by weight. No cobalt compound is precipitated from the resultant solution even after it has stood for ten days at 20° C. If the original solution is concentrated cobalt compounds are precipitated at a cobalt concentration as low as 1.9 percent by weight.

We claim:

1. In a process for the production of an aqueous oxo reaction catalyst solution of cobalt salts of aliphatic carboxylic acids having from two to eight carbon atoms and containing from 3 to 8 percent by weight of cobalt, from an aqueous cobalt solution containing from 0.5 to 1 percent by weight of cobalt and obtained by treating an oxo reaction mixture with an oxidizing agent in an aqueous acid medium at an elevated temperature and thereafter separating the aqueous phase, the improvement which comprises treating said aqueous cobalt solution containing from 0.5 to 1 percent by weight of cobalt with from 0.01 to 3 percent by weight of a noble metal from group VIII of the Periodic System, with reference to the aqueous cobalt solution to be treated, at a temperature of from 50° to 150° C. in the presence of from an equivalent amount up to a 20 percent excess amount of an aliphatic carboxylic acid having from two to eight carbon atoms based on the amount of cobalt in said solution, and subsequently concentrating the solution by distillation until the cobalt content by weight of said solution is from 3 to 8 percent.

2. A process as claimed in claim 1 wherein the noble metal used is palladium.

3. A process as claimed in claim 1 wherein the noble metal used is platinum.

4. A process as claimed in claim 1 wherein the carboxylic acid used is acetic acid.

5. A process as claimed in claim 1 wherein the carboxylic acid used is propionic acid.

6. A process as claimed in claim 1 wherein from 0.5 to 10 liters of molecular oxygen in the form of oxygen or a gas containing molecular oxygen is passed in per liter of the aqueous cobalt salt solution during treatment with the Nobel metal.